United States Patent
Miyake

(10) Patent No.: US 8,306,353 B2
(45) Date of Patent: Nov. 6, 2012

(54) INFORMATION PROCESSING APPARATUS WITH LIGHT PROCESSING, INDICATION SYSTEM, AND COMPUTER READABLE MEDIUM

(75) Inventor: Hiroyuki Miyake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 967 days.

(21) Appl. No.: 12/139,543

(22) Filed: Jun. 16, 2008

(65) Prior Publication Data

US 2009/0097697 A1    Apr. 16, 2009

(30) Foreign Application Priority Data

Oct. 15, 2007    (JP) ................. 2007-267724

(51) Int. Cl.
     *G06K 9/00*      (2006.01)
     *H04N 5/225*      (2006.01)

(52) U.S. Cl. ............ 382/274; 382/100; 382/254

(58) Field of Classification Search .............. None
See application file for complete search history.

(56) References Cited

U.S. PATENT DOCUMENTS

| | | | |
|---|---|---|---|
| 7,333,135 B2* | 2/2008 | Foote et al. | 348/211.12 |
| 2004/0070674 A1 | 4/2004 | Foote et al. | |
| 2004/0183925 A1* | 9/2004 | Raskar et al. | 348/239 |
| 2004/0239888 A1* | 12/2004 | Kobayashi | 353/69 |
| 2009/0251448 A1* | 10/2009 | Kuwabara et al. | 345/207 |

FOREIGN PATENT DOCUMENTS

| | | |
|---|---|---|
| JP | 2003-264849 A | 9/2003 |
| JP | 2005-33756 A | 2/2005 |
| WO | WO 2006103862 A1 * | 10/2006 |

OTHER PUBLICATIONS

Johnson, T. and Fuchs, H. A Unified Multi-Surface, Multi-Resolution Workspace with Camera-Based Scanning and Projector-Based Illumination. Eurographics Symposium on Virtual Environments/Immersive Projection Technology Workshop 2007, Weimar, Germany, Jul. 2007. [online], [retrieved on Oct. 3, 2011]. Retrieved from the internet:< http://www.cs.unc.ed.*

* cited by examiner

Primary Examiner — Jason M Repko
Assistant Examiner — Thomas A James
(74) Attorney, Agent, or Firm — Sughrue Mion, PLLC

(57) ABSTRACT

An information processing apparatus recognizes an object from plural images captured by a image capture device, decides an outline of the recognized object, and calculates average luminances of the inside and the outside of the decided outline. Further, the information processing apparatus determines that a difference between the average luminances of the inside and the outside of the outline is equal to and more than a predetermined value, generates an adjustment image which make gradation increase so that a luminance of any one of the inside and the outside of the outline increases when the difference is equal to and more than the predetermined value, the any one of the inside and the outside of the outline having a lower average luminance than another one. The adjustment image is projected onto the object by a projection device, and then captured by the image capture device.

7 Claims, 9 Drawing Sheets

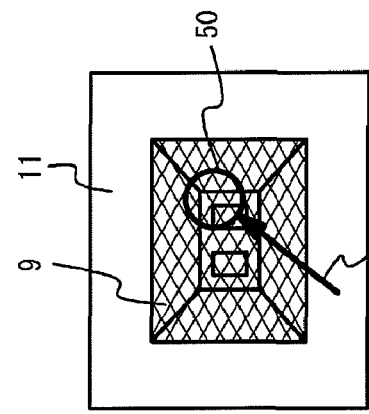
FIG. 4B
CAPTURED IMAGE IMMEDIATELY AFTER OBJECT IS LAID
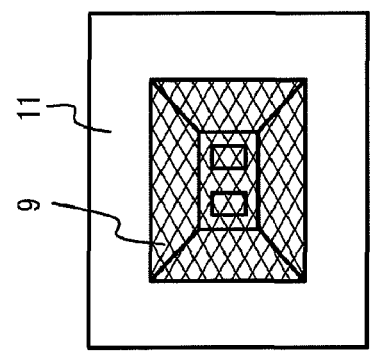
FIG. 4C
CAPTURED IMAGE AFTER LIGHTING PROCESS
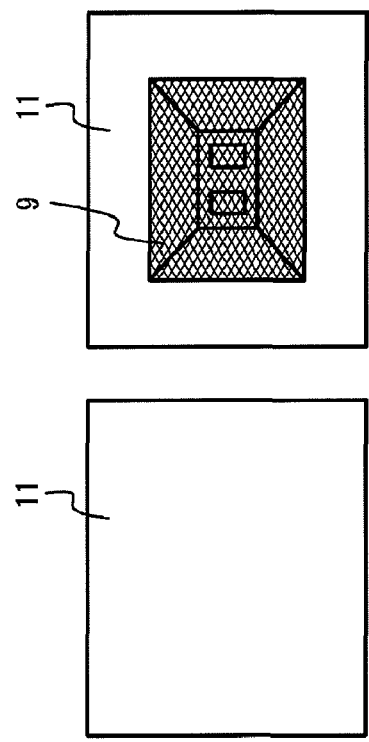
FIG. 4D
CAPTURED IMAGE AFTER ADDITION OF ANNOTATION IMAGE
FIG. 4A
CAPTURED IMAGE IN STATE WITHOUT OBJECT
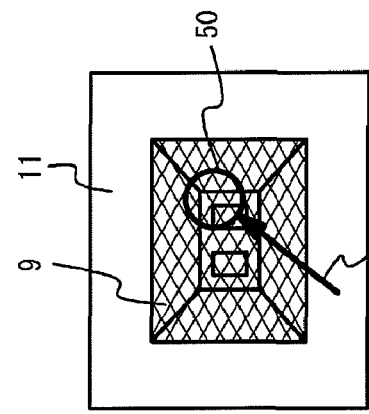
FIG. 4E
PROJECTION IMAGE IN INITIAL STATE
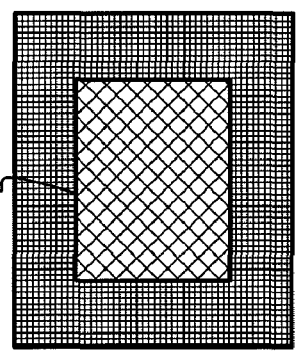
FIG. 4F
PROJECTION IMAGE AFTER LUMINANCE OF INSIDE OF OUTLINE OF OBJECT IS CHANGED
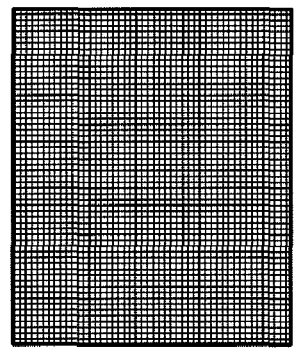
FIG. 4G
PROJECTION IMAGE AFTER ADDITION OF ANNOTATION IMAGE

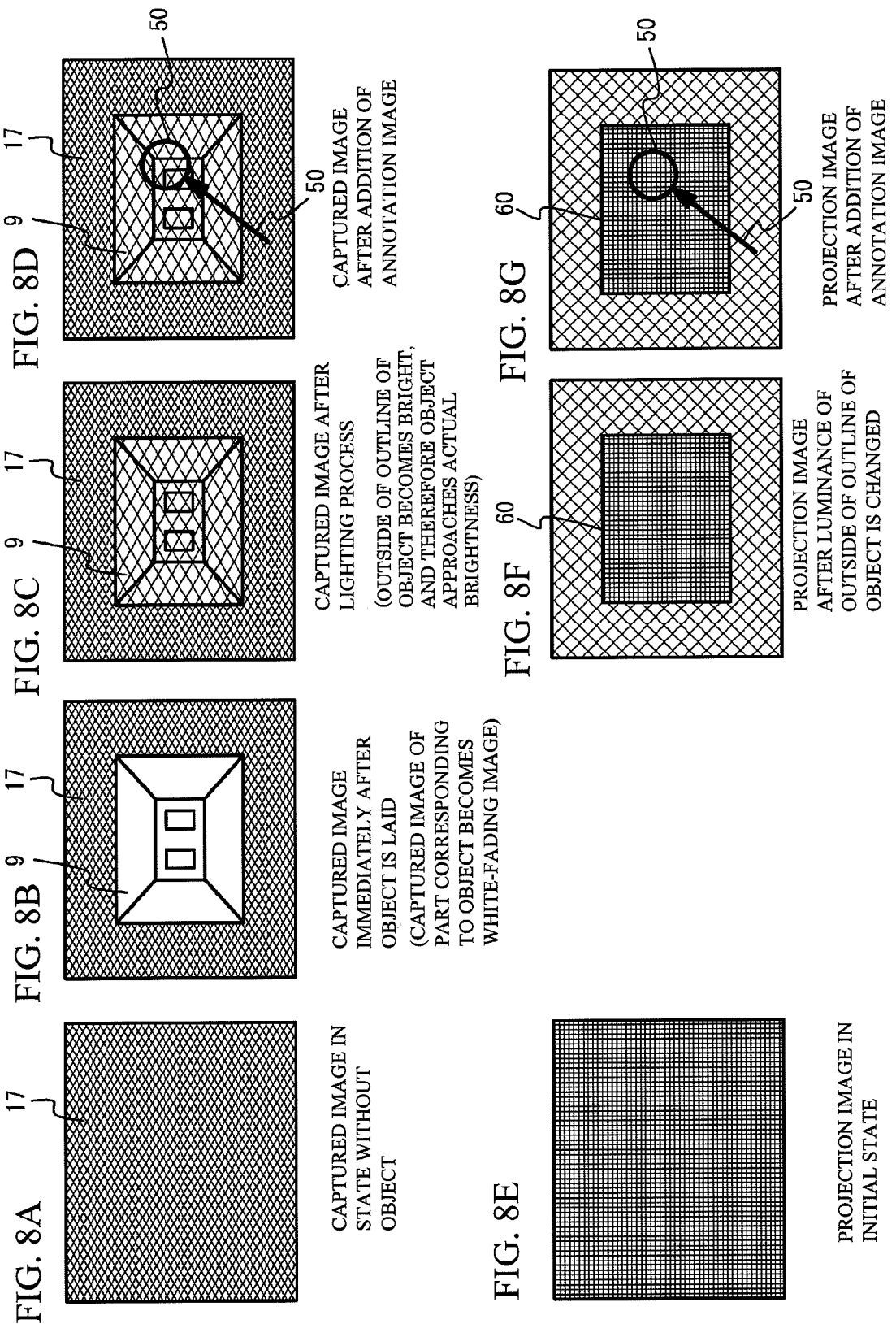

INFORMATION PROCESSING APPARATUS WITH LIGHT PROCESSING, INDICATION SYSTEM, AND COMPUTER READABLE MEDIUM

CROSS-REFERENCE TO RELATED APPLICATION

This application is based on and claims priority under 35 USC 119 from Japanese Patent Application No. 2007-267724 filed Oct. 15, 2007.

BACKGROUND

1. Technical Field

This invention relates to an information processing apparatus, an indication system, and a computer readable medium.

2. Related Art

There has been conventionally known an indication system including a server (e.g. a computer) with which a camera and a projector are connected, and a client (e.g. a computer) connected with the server via a network.

SUMMARY

According to an aspect of the present invention, there is provided an information processing apparatus which is connected to a projection device projecting an annotation image input from an external terminal onto a projection area, and an image capture device capturing the projection area, comprising: a recognizing portion that recognizes an object from a plurality of images captured by the image capture device; an outline deciding portion that decides an outline of the object recognized by the recognizing portion; a calculating portion that calculates average luminances of the inside and the outside of the outline of the object decided by the outline deciding portion; a determining portion that determines that a difference between the average luminance of the inside of the outline calculated by the calculating portion and the average luminance of the outside of the outline calculated by the calculating portion is equal to and more than a predetermined value; a projection image adjusting portion that generates an adjustment image which makes gradation increase so that a luminance of any one of the inside and the outside of the outline of the object increases when the determining portion determines that the difference is equal to and more than the predetermined value, the any one of the inside and the outside of the outline of the object having a lower average luminance than another one; a projection image inputting portion that inputs the adjustment image adjusted by the projection image adjusting portion to the projection device, and causes the projection device to project the adjustment image onto the object; and a capture controlling portion that causes the image capture device to capture the object in a state where the adjustment image is projected onto the object by the projection device.

BRIEF DESCRIPTION OF THE DRAWINGS

Exemplary embodiments of the present invention will be described in detail based on the following figures, wherein:

FIGS. 4A to 4D are diagrams showing examples of captured images of a video camera 5;

FIGS. 4E to 4G are diagrams showing examples of projection images of a projector 4;

FIGS. 8A to 8D are diagrams showing examples of the captured images of the video camera 5 in accordance with a second exemplary embodiment of the present invention;

FIGS. 8E to 8G are diagrams showing examples of projection images of a projector 4.

DETAILED DESCRIPTION

A description will now be given, with reference to the accompanying drawings, of exemplary embodiments of the present invention.

(First Exemplary Embodiment)

Figure 1:
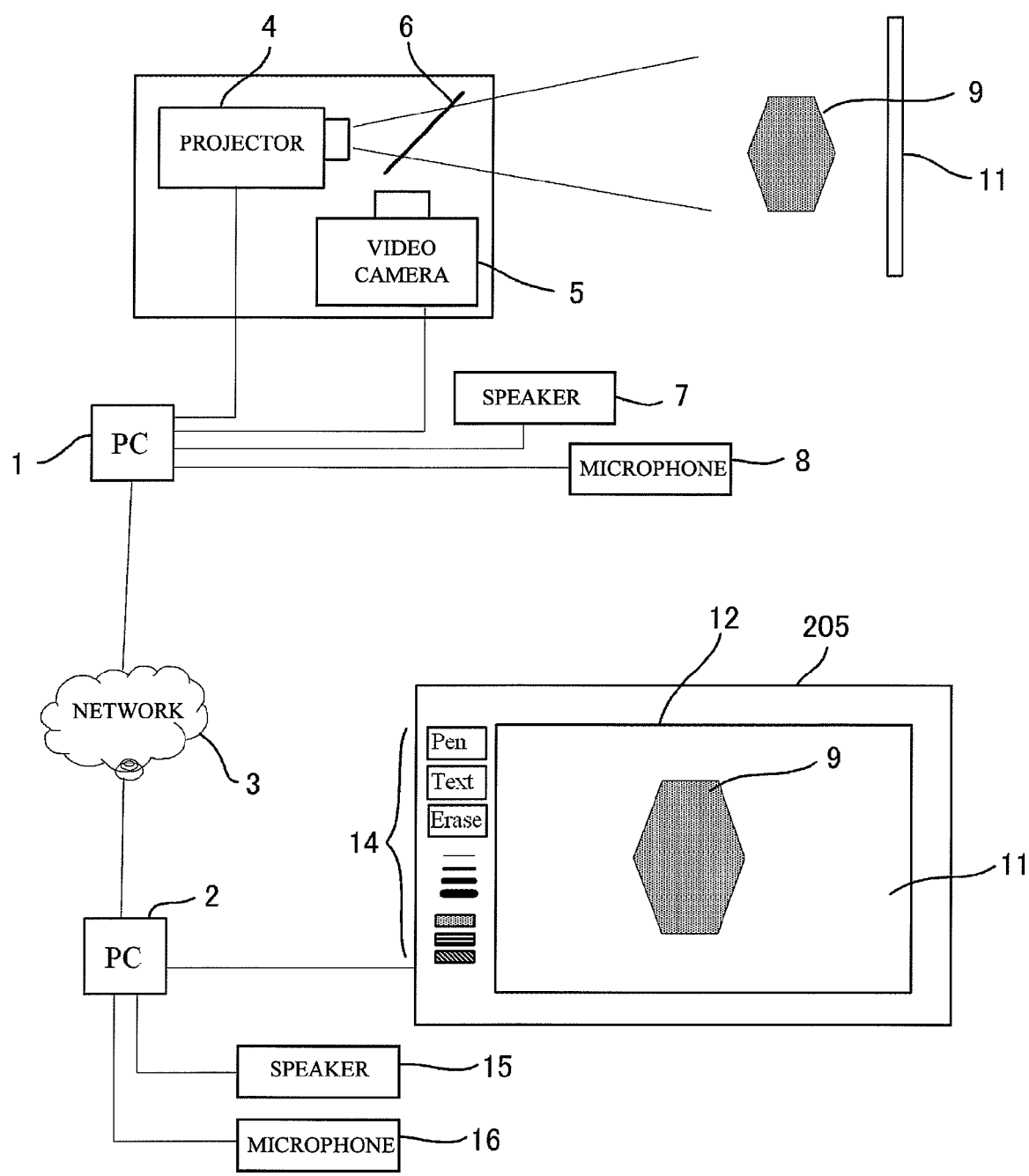
FIG. 1 is a block diagram showing the structure of an indication system in accordance with a first exemplary embodiment of the present invention.

FIG. 1 is a block diagram showing the structure of an indication system in accordance with a first exemplary embodiment of the present invention;

The indication system is provided with a personal computer (PC) 1 functioning as a server, and a personal computer (PC) 2 functioning as a client. These elements are connected to each other via a network 3. A projector 4 (a projection device), a video camera 5 (an image capture device), a speaker 7, and a microphone are connected to the PC 1. Based on a control command from the PC 1, the projector 4 emits a full-scale black image via a half mirror or projects an annotation image or the like via the half mirror onto an object 9 and a screen 11 having color with high luminosity (here, white-type color). It should be noted that the annotation image includes an image of any types such as a line, a character, a symbol, a figure, a color, and a font.

The video camera 5 captures a reflected image of the screen 11 including the object 9 via the half mirror 6, and outputs the captured image to the PC 1. That is, the video camera 5 captures the whole image of the object 9. The video camera 5 is arranged so that a view angle and an optical axis of the video camera 5 are identical with those of the projector 4.

The speaker 7 outputs voice such as an indication of a user of the PC 2 input from a microphone 16 connected to the PC 2. The microphone 8 inputs voice such as an indication of the user of the PC 1, and outputs the voice to a speaker 15 connected to the PC 2.

The PC 1 outputs image captured by the video camera 5 to the PC 2 via the network 3. The PC 2 is connected to a display unit 205 (a display portion), the speaker 15, and the microphone 16. The display unit 205 displays a display area 12 of the captured image and a user interface (UI) 14. It should be noted that the PC 2 may be composed of an all-in-one personal computer including the display unit 205. The speaker 15 outputs voice such as an indication of a user of the PC 1 input from the microphone 8 connected to the PC 1. The microphone 16 inputs voice such as an indication of the user of the PC 2, and outputs the voice to the speaker 7 connected to the PC 1. The user of the PC 1 side and the user of the PC 2 side use the speaker 7 and the microphone 8, and the speaker 15 and the microphone 16, respectively, to communicate with each other by voice.

The UI 14 includes a group of buttons such as a pen button, a text button, and an erase button, and icons defined by lines and colors. The image captured by the video camera 5 is displayed in the display area 12. In FIG. 1, the image of the screen 11 including the object 9 captured by the video camera 5 is displayed in the display area 12. For example, when the pen button of the UI 16 is pressed by an operating unit 204 described later to draw a figure or the like on a certain position (e.g. on the object 9) in the display area 12, the information about the figure is output from the PC 2 to the projector 4 via the PC 1. The projector 4 draws the figure onto a position corresponding to a position of the display area 12 where the figure is drawn (here, onto the object 9) based on the information about the figure.

The PC 2 outputs control commands to the PC 1 so as to control operations of the projector 4, and the video camera 5 (such as a capture angle and brightness of image captured by the video camera 5, and brightness of image projected by the projector 4).

In FIG. 1, the number of clients is only one (the PC 2) but the indication system may include two or more clients (PCs) A part or all of the clients may be located at a remote place.

Figure 2:
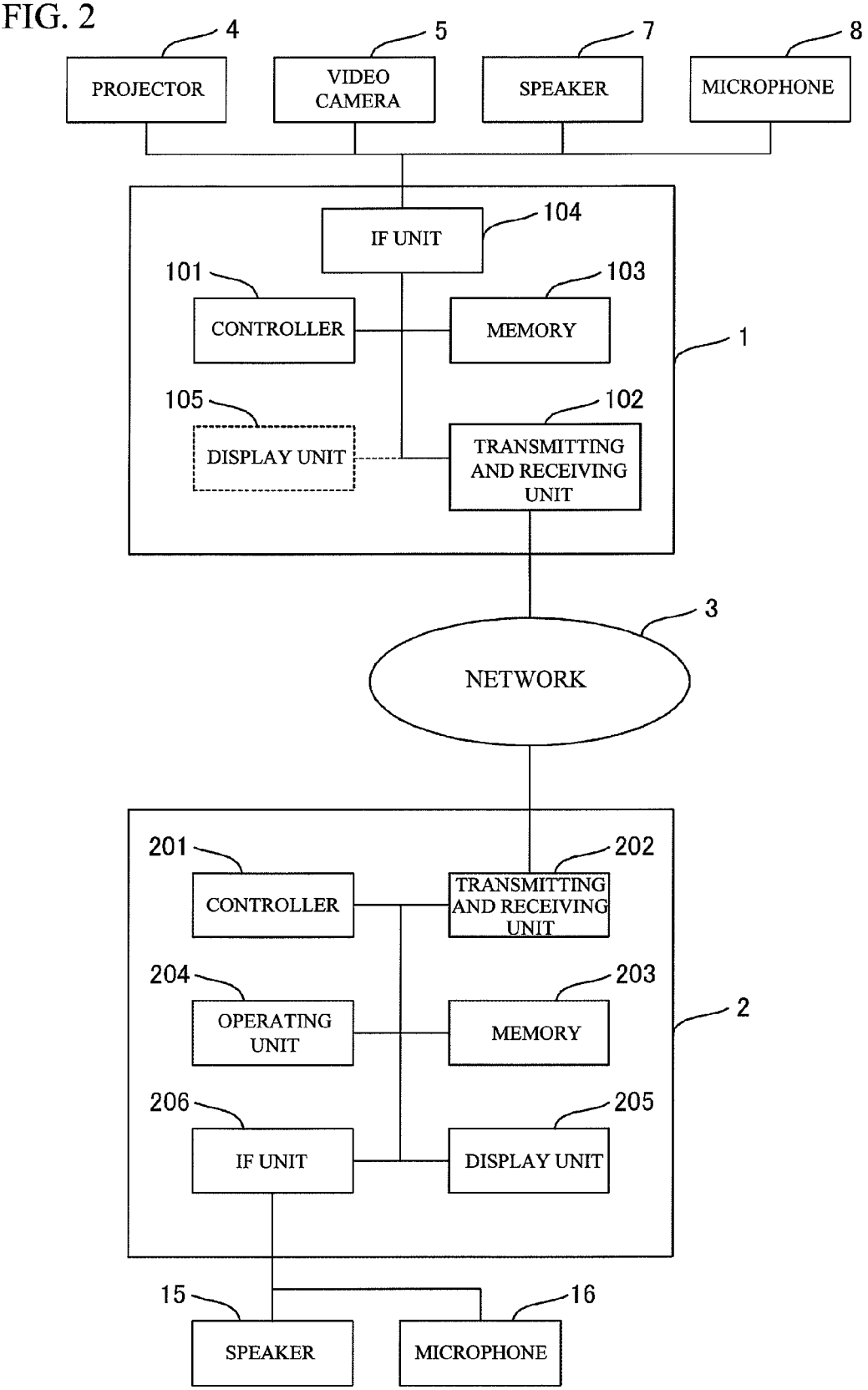
FIG. 2 is a block diagram showing the functional structure of a PC 1 and a PC 2.

FIG. 2 is a block diagram showing the functional structures of the PC 1 and the PC 2.

The PC 1 includes: a controller 101 (a recognizing portion, an outline deciding portion, a calculating portion, a determining portion, a projection image adjusting portion, a projection image inputting portion, and a capture controlling portion) that controls operations of the projector 4, the video camera 5, the speaker 7, and the microphone 8 as well as the entire device; a transmitting and receiving unit 102 (a transmitting portion) that transmits and receives information and data to/from the PC 2 via the network 3; a memory 103 that stores control programs, data, information, and the likes; and an interface (IF) unit 104 that connects to the projector 4, the video camera 5, the speaker 7, and the microphone 8. Further, the PC 1 may include a display unit 105 for displaying the image captured by the video camera 5. The controller 101 is connected to the transmitting and receiving unit 102, the memory 103, the IF unit 104, and the display unit 105. The controller 101 is further connected to the projector 4, the video camera 5, the speaker 7, and the microphone 8 via the IF unit 104.

The PC 2 includes: a controller 201 that controls the entire device; a transmitting and receiving unit 202 (a receiving portion) that transmits and receives information and data to/from the PC 1 via the network 3; a memory 203 that stores controls programs, data, information, and the likes; an operating unit 204 that is formed with a mouse, a keyboard, and the likes; a display unit 205 (a displaying portion) that displays the captured image and the input annotation image; an interface (IF) unit 206 that connects to the speaker 15 and the microphone 16. The controller 201 is connected to the transmitting and receiving unit 202, the memory 203, the operating unit 204, the display unit 205, and the IF unit 206.

Figure 3A:
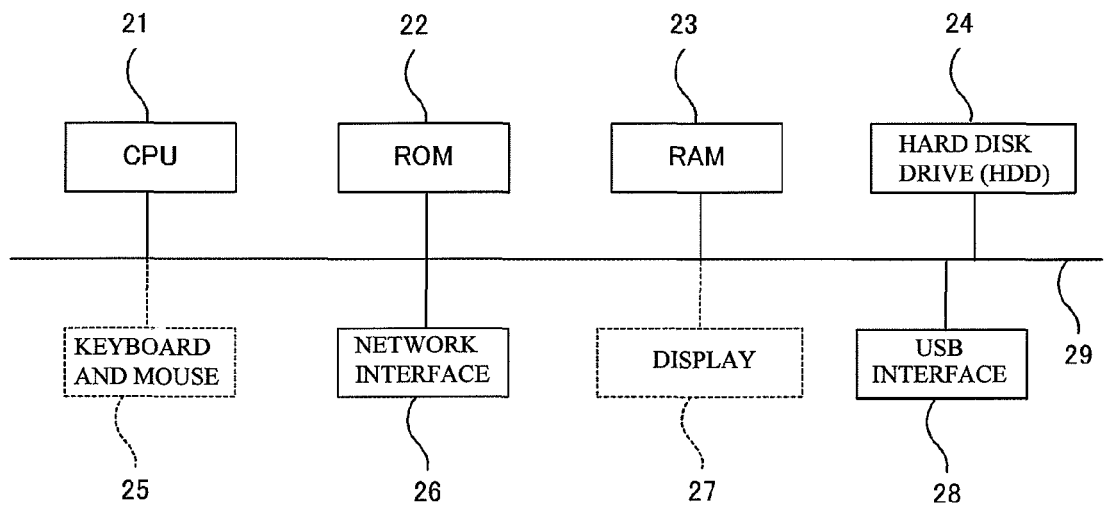
FIG. 3A is a block diagram showing the hardware structure of the PC 1.
Figure 3B:
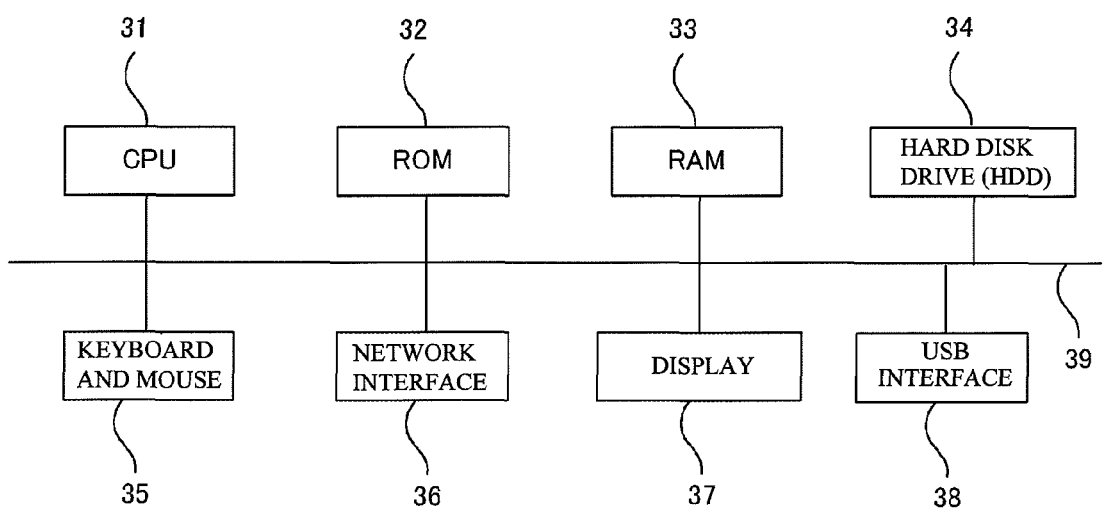
FIG. 3B is a block diagram showing the hardware structure of the PC 2.

FIG. 3A is a block diagram showing the hardware structure of the PC 1, and FIG. 3B is a block diagram showing the hardware structure of the PC 2.

The PC 1 includes: a CPU 21 that controls the entire device; a ROM 22 that stores control programs; a RAM 23 that functions as a working area; a hard disk drive (HDD) 24 that stores various kinds of information and programs; a network interface 26 that connects to another computer; and a USB (universal serial bus) interface 28 that connects to a USB device, not shown. The CPU 21 is connected to the ROM 22, the RAM 23, the hard disk drive (HDD) 24, the network interface 26, and the USB interface 28 via a system bus 29. The PC 1 is connected to the projector 4, the video camera 5, the speaker 7 and the microphone 8 via the USB interface 28. It should be noted that the PC 1 may include a mouse and keyboard 25, and a display 27.

The controller 101 is equivalent to the CPU 21 that performs various kinds of operations in accordance with the control programs. The transmitting and receiving unit 102 is equivalent to the network interface 26, and the memory 103 is equivalent to the hard disk drive (HDD) 24. The display unit 105 is equivalent to the display 27.

The PC 2 includes: a CPU 31 that controls the entire device; a ROM 32 that stores control programs; a RAM 33 that functions as a working area; a hard disk drive (HDD) 34 that stores various kinds of information and programs; a mouse and keyboard 35; a network interface 36 that connects to another computer; a display 37 that is formed with a liquid crystal monitor or a CRT; and a USB (universal serial bus) interface 38 that connects to a USB device, not shown. The CPU 31 is connected to the ROM 32, the RAM 33, the hard disk drive (HDD) 34, the mouse and keyboard 35, the network interface 36, the display 37, and the USB interface 38 via a system bus 39. The PC 2 is connected to the speaker 15 and the microphone 16 via the USB interface 38.

The controller 201 is equivalent to the CPU 31 that performs various kinds of operations in accordance with the control programs. The transmitting and receiving unit 202 is equivalent to the network interface 36, and the memory 203 is equivalent to the hard disk drive (HDD) 34. The operating unit 204 is equivalent to the mouse and keyboard 35, and the display unit 205 is equivalent to the display 37.

FIGS. 4A to 4D show examples of captured images of the video camera 5, and FIGS. 4E to 4G show examples of projection images of the projector 4.

The video camera 5 captures the screen 11 in a state without the object 9, as shown in FIG. 4A. When the object 9 is laid in a capturing range of the video camera 5, the video camera 5 captures the object 9 and the screen 11 as shown in FIG. 4B. When a lighting process described later is executed by the PC 1, the lighting shines on the object 9, and the bright object 9 is captured as shown in FIG. 4C. The object 9 in FIG. 4C is brighter than the object 9 in FIG. 4B. After the lighting process is executed and the annotation image is projected, the image captured by the video camera 5 is shown in FIG. 4D. Reference numeral 50 in FIG. 4D designates the annotation image.

On the other hand, the projector 4 projects, for example, the whole black image in an initial state as shown in FIG. 4E. When the lighting process described later is executed by the PC 1, the projector 4 projects an image in which the outside of the outline 60 of the object 9 is black and the inside of the outline 60 of the object 9 is gray, as shown in FIG. 4F. Thus, when the lighting process is executed, the projector 4 projects the image in which the luminosity of the inside of the outline of the object 9 is increased. Therefore, the object 9 captured by the video camera 5 becomes bright as shown in FIG. 4C. After the lighting process is executed, the projection image to which the annotation image is added is shown in FIG. 4G. Reference numeral 50 in FIG. 4G designates the annotation image.

Figure 5:
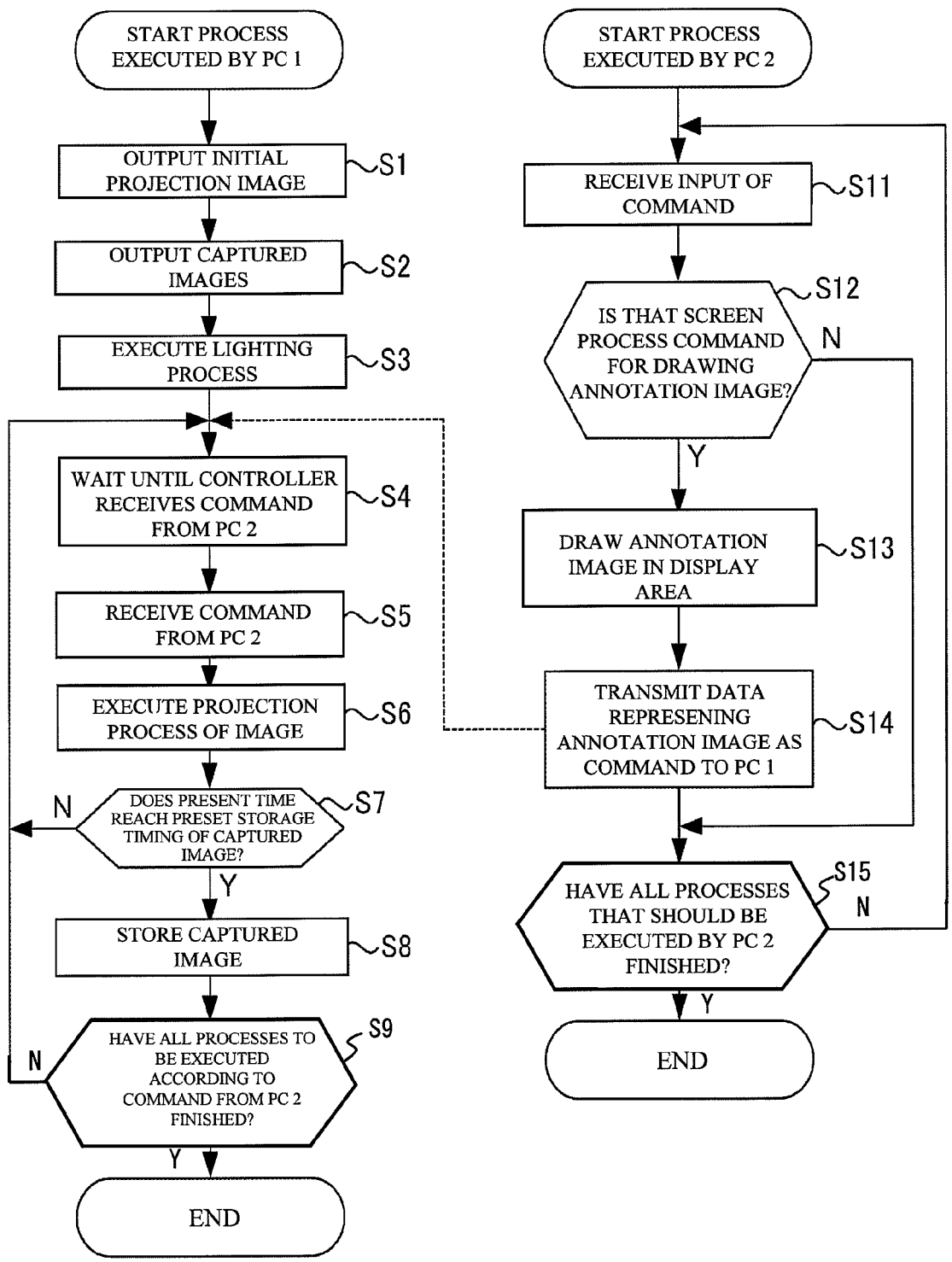
FIG. 5 is a flowchart showing processes executed by the PC 1 and the PC 2.

FIG. 5 is a flowchart showing processes executed by the PC 1 and the PC 2.

First, a description will now be given of a process executed by the PC 1. The controller 101 of the PC 1 outputs an initial projection image via the projector 4 (step S1). The initial projection image is the whole black image.

Next, the controller 101 outputs the images captured by the video camera 5 to the PC 2 via the transmitting and receiving unit 102 and the network 3 (step S2), and executes the lighting process (step S3). The details of the lighting process will be described later.

Then, the controller 101 waits until the controller 101 receives a command from the PC 2 (step S4). Specifically, the command from the PC 2 includes data representing the annotation image and a drawing indication of the data. The data representing the annotation image includes vector information, coordinate information and the like that are necessary to draw the annotation image. For example, when the annotation image is a circle, the data representing the annotation image is information representing a center and a radius of the circle by text data.

Next, when the transmitting and receiving unit 102 receives the command from the PC 2 (step S5), the controller 101 executes a projection process of the image according to the command (step S6). Specifically, when data representing the annotation image is received from the PC 2, the controller 101 outputs the data representing the annotation image to the projector 4. The projector 4 projects the annotation image based on this data.

The controller 101 determines whether the present time reaches preset storage timing of the captured image (step S7). For example, when it is set to store the captured image for each 0.2 seconds, the preset storage timing of the captured image is timing of elapse of each 0.2 seconds. When the answer to the determination of step S7 is YES, the controller 101 stores the captured image in the memory 103. When the answer to the determination of step S7 is NO, the process returns to step S4.

Next, the controller 101 determines whether all the processes to be executed according to a command from the PC 2 have finished (step S9). When the answer to the determination of step S9 is NO, the process returns to step S4. On the other hand, when the answer to the determination of step S9 is YES, the process executed by the PC 1 is terminated.

Next, a description will now be given of a process executed by the PC 2.

Then the controller 201 receives input of a command from the operating unit 204 (step S11), the controller 201 determines whether the command is a screen process command for drawing the annotation image (step S12).

When the answer to the determination of step S12 is NO, the process proceeds to step S15 described later. When the answer to the determination of step S12 is YES, the controller 201 draws the annotation image in the display area 12 according to the screen process command (step S13).

Next, the controller 201 transmits data representing the annotation image as a command to the PC 1 via the transmitting and receiving unit 202 (step S14). The command transmitted to the PC 1 is received by the transmitting and receiving unit 102 in a procedure of the step S5.

Finally, the controller 201 determines whether all the processes that should be executed by the PC 2 have finished (step S15). When the answer to the determination of step S15 is NO, the process returns to step S11. On the other hand, when the answer to the determination of step S15 is YES, the process executed by the PC 2 is terminated.

Figure 6:
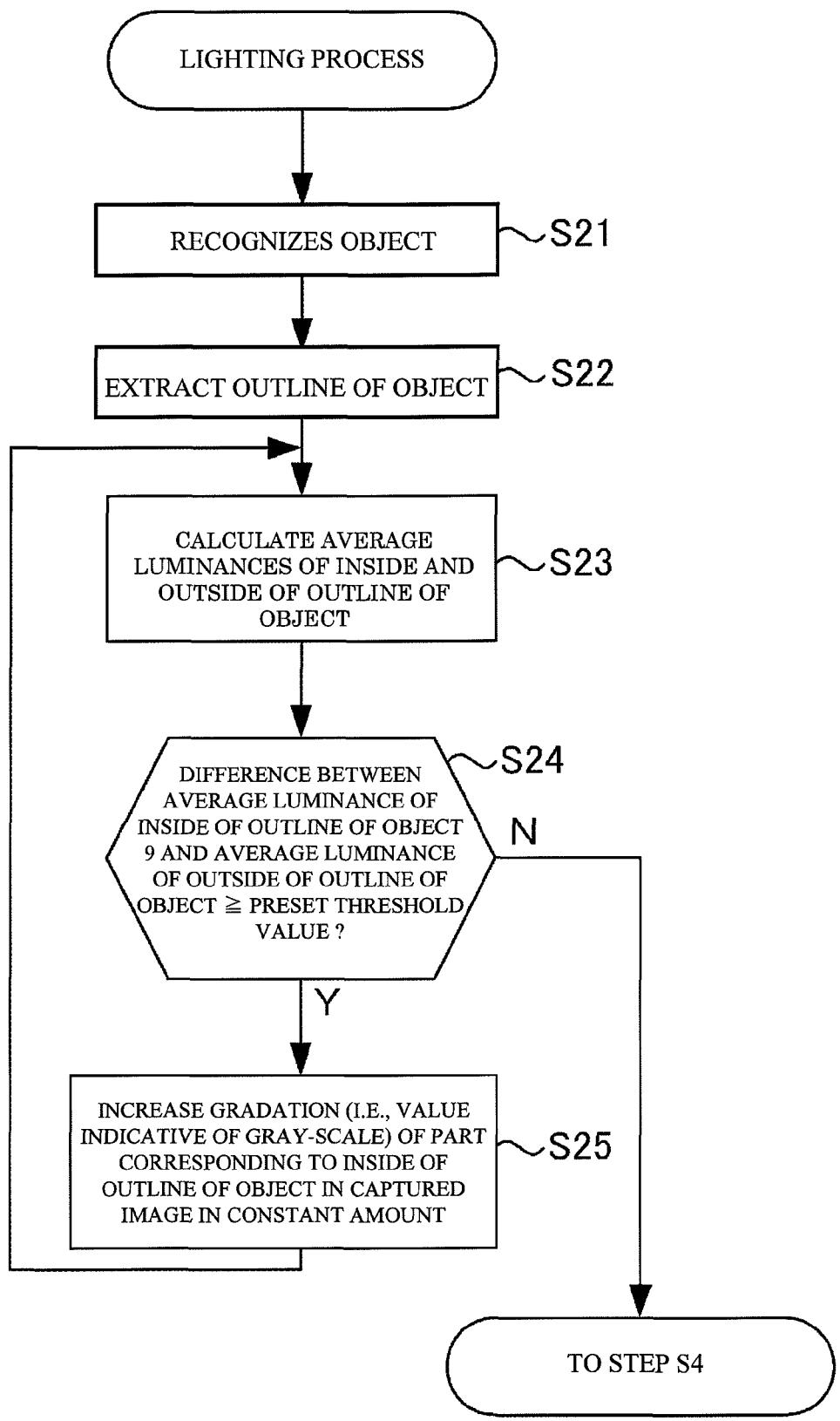
FIG. 6 is a flowchart showing a lighting process executed in step S3 of FIG. 5.

FIG. 6 is a flowchart showing the lighting process executed in step S3 of FIG. 5;

First, the controller 101 automatically recognizes the object 9 from a change of images captured by the video camera 5 (step S21). That is, when the change occurs to plural sequential frame images captured by the video camera 5, the controller 101 compares a frame image after the change has completed with a frame image before the change occurs, to thereby recognize the object 9. More specifically, the controller 101 compares the captured image in which the object 9 is laid in the capturing range of the video camera 5 as shown in FIG. 4B with the captured image in which the object 9 is not laid in the capturing range of the video camera 5 as shown in FIG. 4A, to thereby recognize the object 9.

Next, the controller 101 extracts the outline of the object 9 (step S22). In this process, a well-known outline extraction process such as a template match method and a brightness approximation plane method is used. It should be noted that, in the first exemplary embodiment, the video camera 5 is arranged so that the view angle and the optical axis of the video camera 5 are identical with those of the projector 4 via the half mirror 6. With this arrangement, the controller 101 can accurately capture the outline of the object 9. The view angle of the projector 4 does not always have to be identical with that of the video camera 5. When the view angle of the projector 4 is not identical with that of the video camera 5, the shape measurement or the like of the solid thing, i.e., the object 9 is needed to accurately project light from the projector 4 onto the object 9, and it is therefore preferable that the view angle of the projector 4 is identical with that of the video camera 5.

Next, the controller 101 calculates average luminances of the inside and the outside of the outline of the object 9 included in the captured image (step S23). Here, the average luminance includes a simple average, a root mean square, a weighted average, or the like. Moreover, the controller 101 may calculate not only the average luminance but a value which can be treated equally to the average luminance (e.g. an unnormalized value, etc.). For a calculation method of the average luminance, a conventionally known method can be properly used. For example, as described after paragraph 0017 of Japanese Patent Application Publication No. 2003-264849, the average luminance can be calculated by converting RGB (Red, Green, Blue) information into image information of HSI (Hue, Saturation, Intensity) space.

Here, the controller 101 may calculate average luminances of the entire inside and the entire outside of the outline of the object 9. Further, the controller 101 may decide a single line passing through the inside and the outside of the outline of the object 9, and calculate average luminances of parts corresponding to the inside and the outside of the outline on the single line. In this case, a calculation amount of the latter calculation method of the average luminances is reduced than that of the former calculation method, and hence the process speed of the latter calculation method becomes fast.

The controller 101 determines whether a difference between the calculated average luminance of the inside of the outline of the object 9 and the calculated average luminance of the outside of the outline of the object 9 is equal to and more than a preset threshold value (step S24).

In step S24, when the difference is equal to and more than a preset threshold value (YES), the controller 101 compares the average luminance of the inside of the outline and the average luminance of the outside of the outline with each other, selects the one with a low average luminance (i.e., the average luminance of the inside of the outline in the case of the first exemplary embodiment), and changes a color of the part corresponding to the inside of the outline of the object 9 in the captured image to gray, i.e., increases gradation (i.e., a value indicative of gray-scale) of the part corresponding to the inside of the outline of the object 9 in the captured image in a constant amount (step S25). Then the process returns to step S23. Here, it is not appropriate to make the gradation not gray but white, so that when the annotation image is projected onto the object 9, it is difficult to see the annotation image. It should be noted that the changeable level of the gradation may have one stage or plural stages. When the changeable level of the gradation has the plural stages, in a loop process of steps S23 to S25, the controller 101 repeats the increase of a gradation level of the part corresponding to the inside of the outline of the object 9 in the captured image until the difference between the average luminance of the inside of the outline of the object 9 and the average luminance of the outside of the outline of the object 9 is less than the preset threshold value.

In step S24, when the difference is less than the preset threshold value (NO), the controller 101 completes the lighting process, and the process proceeds to step S4 described above.

According to the lighting process, contrast between the part corresponding to the inside of the outline of the object 9 in the captured image and the part corresponding to the outside of the outline of the object 9 in the captured image is adjusted, the part corresponding to the inside of the outline of the object 9 in the captured image becomes bright. When the image capture device captures an object in a state where an object is formed with a dark color and a background is a white-type color, the background in the captured image causes a so-called white-fading, and a case in which the object is too dark occurs. However, if the difference of the luminance between the object and the rest is put within the preset range as described above, the difference of the luminance decreases, and hence the visibility of the captured image is improved. In the case of the first exemplary embodiment, other areas are not lightened in accordance with the object 9. As a result, even when the annotation image is projected onto a surrounding part of the object 9 on the screen 11, the contrast between the object 9 and a surrounding part thereof is secured.

As a variation of the above-mentioned lighting process, the controller 101 may calculate a luminance distribution in a single direction (e.g. a horizontal (or lateral) direction, or a vertical (or longitudinal) direction) concerning the inside and the outside of the outline of the object, and increase the gradation of the part corresponding to the inside of the outline of the object 9 in the captured image depending on the calculation result.

Figure 7A:
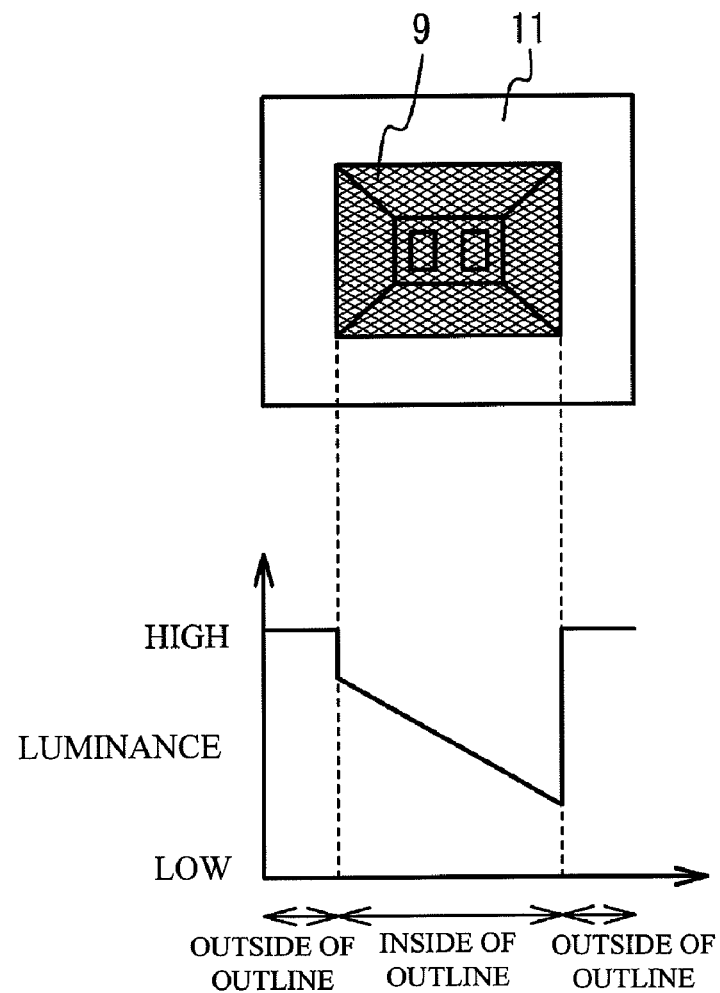
FIG. 7A is a diagram showing an example of a calculation result of a luminance distribution in a horizontal (or lateral) direction concerning the inside and the outside of an outline of the object.
Figure 7B:
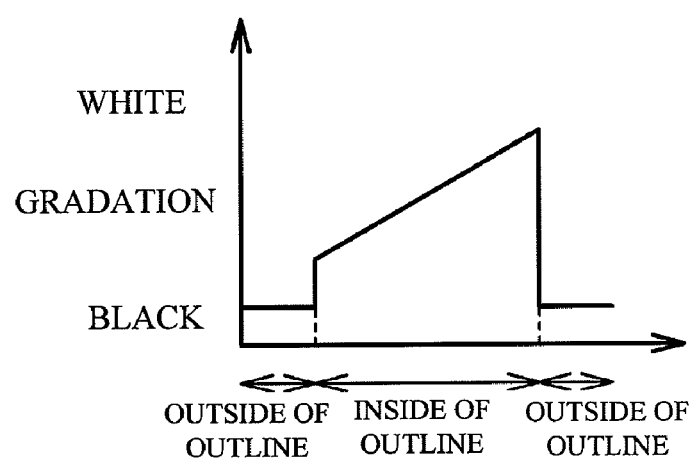
FIG. 7B is a diagram showing an example of tone adjustment of a part corresponding to the inside of the outline in the captured image.

For example, FIG. 7A shows an example of a calculation result of the luminance distribution in a horizontal (or lateral) direction concerning the inside and the outside of the outline of the object 9. In this case, the luminance of the inside of the outline of the object 9 decreases from a left side thereof to a right side thereof. Therefore, the controller 101 gradually increases the gradation of the part corresponding to the inside of the outline of the object 9 from the left side of the part to the right side thereof (see FIG. 7B).

(Second Exemplary Embodiment)

In the first exemplary embodiment, the description has been given of in the case where the object 9 is formed with a dark color and the white-type screen 11 is used as the background of the object 9. In the second exemplary embodiment, a description will now be given of in the case where the background is a blackboard and the object 9 is formed with a white-type bright color.

The structure of the indication system, the PC 1, and the PC 2 in accordance with the second exemplary embodiment is the same as corresponding one of the first exemplary embodiment described above, and therefore a description thereof is omitted.

FIGS. 8A to 8D show examples of the captured images of the video camera 5, and FIGS. 8E to 8G show examples of projection images of the projector 4.

The video camera 5 captures a blackboard 17 in a state without the object 9, as shown in FIG. 8A. Therefore, the captured image is dark. When the object 9 is laid in a capturing range of the video camera 5, the video camera 5 captures the object 9 and the blackboard 17 as shown in FIG. 8B. In this case, the captured image of a part corresponding to the object 9 becomes a so-called white-fading image in which gradation of a bright part is lost. When a lighting process described later is executed by the PC 1, the lighting shines on the outside of the outline of the object 9, and the outside of the outline of the object 9 becomes bright. Therefore, the object 9 approaches actual brightness (i.e., brightness when the object 9 is directly seen by the user). The object 9 of FIG. 8C is corrected with reference to the white-fading and slightly darkens than object 9 of FIG. 8B. After the lighting process is executed and the annotation image is projected, the image captured by the video camera 5 is shown in FIG. 8D. Reference numeral 50 in FIG. 8D designates the annotation image.

On the other hand, the projector 4 projects, for example, the whole black image in an initial state as shown in FIG. 8E. When the lighting process described later is executed by the PC 1, the projector 4 projects an image in which the outside of the outline 60 of the object 9 is gray and the inside of the outline 60 of the object 9 is black, as shown in FIG. 8F. Thus, when the lighting process is executed, the projector 4 projects the image in which the luminosity of the outside of the outline of the object 9 is increased. Therefore, the object 9 captured by the video camera 5 approaches actual brightness (i.e., brightness when the object 9 is directly seen by the user) as shown in FIG. 8C. After the lighting process is executed, the projection image to which the annotation image is added is shown in FIG. 8G. Reference numeral 50 in FIG. 4G designates the annotation image.

Figure 9:
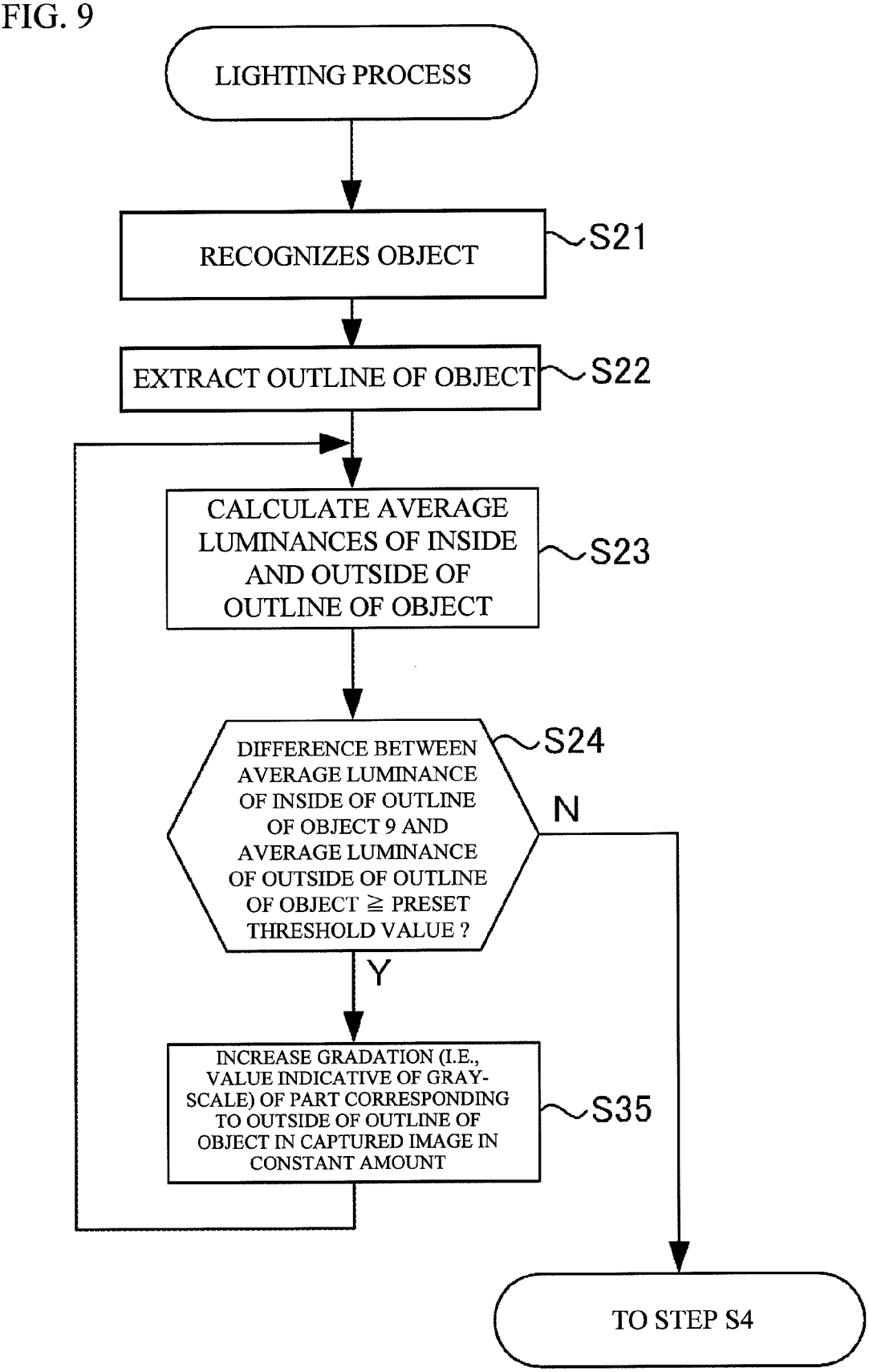
FIG. 9 is a flowchart showing a lighting process executed in step S3 of FIG. 5.

FIG. 9 is a flowchart showing the lighting process executed in step S3 of FIG. 5. It should be noted that, in the second exemplary embodiment, the PC 1 and the PC 2 also execute the same process as FIG. 5.

The procedures of steps S21 to S24 in FIG. 9 is the same as that of steps S21 to S24 in FIG. 6.

In step S24, when the difference is equal to and more than a preset threshold value (YES), the controller 101 compares the average luminance of the inside of the outline and the average luminance of the outside of the outline with each other, selects the one with a low average luminance (i.e., the average luminance of the outside of the outline in the case of the second exemplary embodiment), and changes a color of the part corresponding to the outside of the outline of the object 9 in the captured image to gray, i.e., increases gradation of the part corresponding to the outside of the outline of the object 9 in the captured image in a constant amount (step S35). Then the process returns to step S23. It should be noted that the changeable level of the gradation may have one stage or plural stages. When the changeable level of the gradation has the plural stages, in a loop process of steps S23 to S35, the controller 101 repeats the increase of a gradation level of the part corresponding to the outside of the outline of the object 9 in the captured image until the difference between the average luminance of the inside of the outline of the object 9 and the average luminance of the outside of the outline of the object 9 is less than the preset threshold value.

In step S24, when the difference is less than the preset threshold value (NO), the controller 101 completes the lighting process, and the process proceeds to step S4 described above.

According to the lighting process, contrast between the part corresponding to the inside of the outline of the object 9 in the captured image and the part corresponding to the outside of the outline of the object 9 in the captured image is adjusted, the part corresponding to the outside of the outline of the object 9 in the captured image becomes bright. In the second exemplary embodiment, the outside of the outline of the object 9 is not lightened in accordance with the object 9. As a result, even when the annotation image is projected onto the object 9, the contrast between the object 9 and a surrounding part thereof is secured.

As a variation of the above-mentioned lighting process, the controller 101 may calculate the luminance distribution in a single direction (e.g. a horizontal (or lateral) direction, or a vertical (or longitudinal) direction) concerning the inside and the outside of the outline of the object, and increase the gradation of the part corresponding to the outside of the outline of the object 9 in the captured image depending on the calculation result.

A recording medium on which the software program for realizing the functions of the PC 1 and the PC 2 is recorded may be supplied to each PC, and the CPU of each PC may read and execute the program recorded on the recording medium. In this manner, the same effects as those of the above-described first to third exemplary embodiments can be achieved. The recording medium for providing the program may be a CD-ROM, a DVD, or a SD card, for example.

Alternatively, the CPU of each PC may execute a software program for realizing the functions of each PC, so as to achieve the same effects as those of the above-described first to third exemplary embodiments.

It should be noted that the present invention is not limited to those exemplary embodiments, and various modifications may be made to them without departing from the scope of the invention.

What is claimed is:

1. An information processing apparatus which is connected to a projection device projecting an annotation image input from an external terminal onto a projection area, and an image capture device capturing the projection area, comprising:
    a recognizing portion that recognizes an object from a plurality of images captured by the image capture device;
    an outline deciding portion that decides an outline of the object recognized by the recognizing portion;
    a calculating portion that calculates average luminances of an area inside and an area outside of the outline of the object decided by the outline deciding portion;
    a determining portion that determines a difference between the average luminance of the area inside of the outline calculated by the calculating portion and the average luminance of the area outside of the outline calculated by the calculating portion, and determines whether the determined difference is equal to or greater than a predetermined value;
    a projection image adjusting portion that, when the determining portion determines that the determined difference is equal to or greater than the threshold value, generates an adjustment image comprising an inside area corresponding to the area inside of the outline of the object and an outside area corresponding to the area outside of the outline, and the projection image adjusting portion sets a luminance of either the inside area of the adjustment image or the outside area of the adjustment image;
    a projection image inputting portion that inputs the adjustment image generated by the projection image adjusting portion to the projection device, and causes the projection device to project the adjustment image onto the object; and
    a capture controlling portion that causes the image capture device to capture the object in a state where the adjustment image is projected onto the object by the projection device,
    wherein the projection image adjusting portion sets the luminance of either the inside area of the adjustment image or the outside area of the adjustment image such that, when the adjustment image is projected onto the object, a gradation of the luminance of whichever one of the inside area and the outside area of the outline of the object has the lower average luminance is increased.

2. The information processing apparatus according to claim 1, wherein the calculating portion calculates a luminance distribution in a single direction concerning the inside area and the outside area of the outline of the object, and the average luminances of the inside area and the outside area of the outline of the object based on the luminance distribution, and the gradation of the one of the inside area and the outside area of the outline of the object in the image projected by the projection device depending on a calculation result of the luminance distribution.

3. The information processing apparatus according to claim 1, wherein the calculating portion decides a single line passing through the inside area and the outside area of the outline of the object, and calculates average luminances of the inside area and the outside arean based on the single line.

4. An indication system comprising:
    an information processing apparatus which is connected to a projection device projecting an annotation image input from an external terminal onto a projection area, and an image capture device capturing the projection area, the information processing apparatus including:
    a recognizing portion that recognizes an object from a plurality of images captured by the image capture device;
    an outline deciding portion that decides an outline of the object recognized by the recognizing portion;
    a calculating portion that calculates average luminances of an area inside and an area outside of the outline of the object decided by the outline deciding portion;
    a determining portion that determines a difference between the average luminance of the area inside of the outline calculated by the calculating portion and the average luminance of the area outside of the outline calculated by the calculating portion, and determines whether the determined difference is equal to or greater than a predetermined value;
    a projection image adjusting portion that, when the determining portion determines that the determined difference is equal to or greater than the predetermined value, generates an adjustment image comprising an inside area corresponding to the area inside of the outline of the object and an outside area corresponding to the area outside of the outline, and the projection image adjusting portion sets a luminance of either the inside area of the adjustment image or the outside area of the adjustment image;

a projection image inputting portion that inputs the adjustment image generated by the projection image adjusting portion to the projection device, and causes the projection device to project the adjustment image onto the object;

a capture controlling portion that causes the image capture device to capture the object in a state where the adjustment image is projected onto the object by the projection device; and a transmitting portion that transmits at least one image captured by the image capture device to the external terminal;

the external terminal including:

a receiving portion that receives the image captured by the image capture device from the information processing apparatus; and a displaying portion that displays the received image, wherein the projection image adjusting portion sets the luminance of either the inside area of the adjustment image or the outside area of the adjustment image such that, when the adjustment image is projected onto the object, a gradation of the luminance of whichever one of the inside area and the outside area of the outline of the object has the lower average luminance is increased.

5. A non-transitory computer readable medium causing a computer to execute a process, the computer being connected to a projection device projecting an annotation image input from an external terminal onto a projection area, and an image capture device capturing the projection area, the process comprising:

recognizing an object from a plurality of images captured by the image capture device;

deciding an outline of the recognized object;

calculating average luminances of an area inside and an area outside of the decided outline of the object;

determining a difference between the calculated average luminance of the area inside of the outline and the calculated average luminance of the area outside of the outline, and determining whether the determined difference is equal to or greater than a predetermined value;

generating, when the determined difference is equal to or greater than the predetermined value, an adjustment image comprising an inside area corresponding to the area inside of the outline of the object and an outside area corresponding to the area outside of the outline, and setting a luminance of either the inside area of the adjustment image or the outside area of the adjustment image;

inputting the adjustment image to the projection device, and causing the projection device to project the adjustment image onto the object; and causing the image capture device to capture the object in a state where the adjustment image is projected onto the object, wherein the luminance of either the inside area of the adjustment image or the outside area of the adjustment image is set such that, when the adjustment image is projected onto the object, a gradation of the luminance of whichever one of the inside area and the outside area of the outline of the object has the lower average luminance is increased.

6. The information processing apparatus according to claim 1, further comprising an annotation unit that, after the capture controlling portion causes the image capture device to capture the object in the state where the adjustment image is projected onto the object by the projection device, adds an annotation image to the captured object.

7. The information processing apparatus according to claim 1, wherein the adjustment image is separate from the image captured by the image capture device.

* * * * *